United States Patent
Park et al.

(10) Patent No.: US 11,246,151 B2
(45) Date of Patent: Feb. 8, 2022

(54) METHOD AND APPARATUS FOR TRANSMITTING OR RECEIVING WIRELESS SIGNAL IN WIRELESS COMMUNICATION SYSTEM

(71) Applicant: LG Electronics Inc., Seoul (KR)

(72) Inventors: Changhwan Park, Seoul (KR); Jaehyung Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 53 days.

(21) Appl. No.: 16/638,699

(22) PCT Filed: Aug. 22, 2018

(86) PCT No.: PCT/KR2018/009656
§ 371 (c)(1),
(2) Date: Feb. 12, 2020

(87) PCT Pub. No.: WO2019/039860
PCT Pub. Date: Feb. 28, 2019

(65) Prior Publication Data
US 2021/0127409 A1    Apr. 29, 2021

Related U.S. Application Data

(60) Provisional application No. 62/548,925, filed on Aug. 22, 2017.

(51) Int. Cl.
*H04W 72/12* (2009.01)
*G16Y 10/75* (2020.01)
(Continued)

(52) U.S. Cl.
CPC ........ *H04W 72/1268* (2013.01); *G16Y 10/75* (2020.01); *G16Y 20/30* (2020.01);
(Continued)

(58) Field of Classification Search
CPC ........ H04W 72/1268; H04W 72/0446; H04W 74/0866; H04W 72/042; H04W 74/004;
(Continued)

(56) References Cited

U.S. PATENT DOCUMENTS

2015/0036566 A1    2/2015   Blankenship et al.
2017/0164350 A1    6/2017   Sun et al.
(Continued)

OTHER PUBLICATIONS

Huawei, HiSilicon, "On physical layer SR", 3GPP TSG RAN WG1 Meeting #89, May 15-19, 2017, R1-1707022.
(Continued)

*Primary Examiner* — Thai Nguyen
(74) *Attorney, Agent, or Firm* — Dentons US LLP

(57) ABSTRACT

The present invention relates to a wireless communication system and, in particular, to a method and an apparatus therefor, the method comprising the steps of: receiving uplink scheduling information from a base station; and repeatedly transmitting a PUSCH according to the uplink scheduling information, wherein, when repeated transmission of the PUSCH is performed in a PRACH transmission gap, the repeated transmission of the PUSCH in the PRACH transmission gap is at least partially dropped or delayed.

10 Claims, 13 Drawing Sheets

(51) Int. Cl.
  *G16Y 20/30* (2020.01)
  *H04L 5/00* (2006.01)
  *H04W 72/04* (2009.01)
  *H04W 74/08* (2009.01)

(52) U.S. Cl.
  CPC ....... *H04L 5/0051* (2013.01); *H04W 72/0446* (2013.01); *H04W 74/0866* (2013.01)

(58) Field of Classification Search
  CPC ... H04W 74/0833; G16Y 10/75; G16Y 20/30; H04L 5/0051; H04L 1/1861; H04L 5/005; H04L 5/0055; H04L 1/08; H04L 5/0094; H04L 5/0082
  See application file for complete search history.

(56) References Cited

U.S. PATENT DOCUMENTS

2017/0171859 A1* 6/2017 Nimbalker ............ H04L 5/0053
2019/0075602 A1* 3/2019 Lin ................... H04W 72/0453

OTHER PUBLICATIONS

Qualcomm Incorporated, "Discussion on NPUSCH transmission during UL NPRACH gaps", 3GPP TSG RAN WG1 Meeting #90, Aug. 21-25, 2017, R1-1712760.
Samsung, "New SPS mechanism for power saving", 3GPP TSG RAN WG1 Meeting #90, Aug. 21-25, 2017, R1-1713546.

\* cited by examiner

FIG. 10
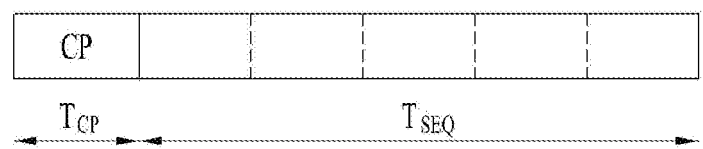
(a) Preamble symbol group
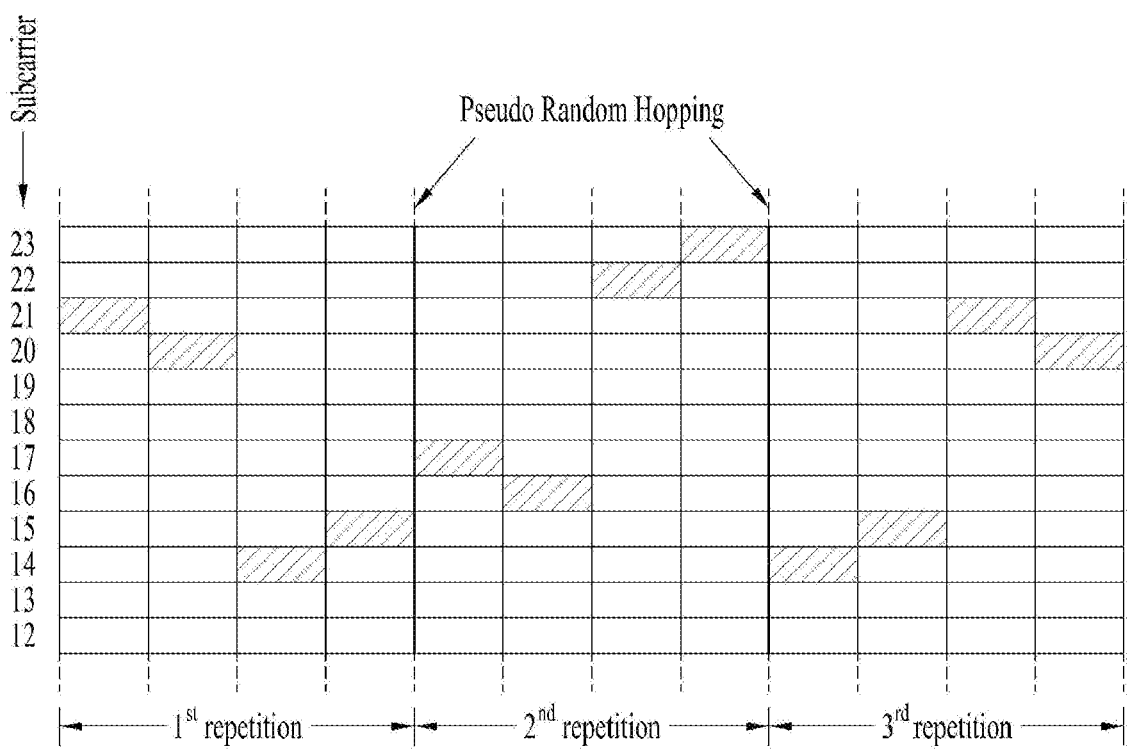
(b) Preamble transmission

METHOD AND APPARATUS FOR TRANSMITTING OR RECEIVING WIRELESS SIGNAL IN WIRELESS COMMUNICATION SYSTEM

This application is a National Stage Entry of International Application No. PCT/KR2018/009656 filed Aug. 22, 2018, which claims the benefit of U.S. Provisional Application No. 62/548,925 filed Aug. 22, 2017, all of which are hereby incorporated by reference in their entirety for all purposes as if fully set forth herein.

TECHNICAL FIELD

The present disclosure relates to a wireless communication system, and more particularly, to a method and apparatus for transmitting/receiving a wireless signal. The wireless communication system includes a narrowband Internet of things (NB-IoT)-based wireless communication system.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An aspect of the present disclosure is to provide a method and apparatus for efficiently transmitting and receiving a wireless signal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting a signal by a UE in a wireless communication system includes receiving uplink scheduling information from a base station (BS), and repeatedly transmitting a physical uplink shared channel (PUSCH) based on the uplink scheduling information. When the PUSCH is repeatedly transmitted in a physical random access channel (PRACH) transmission gap, at least a part of the repeated transmissions of the PUSCH is dropped or delayed.

In another aspect of the present disclosure, a UE in a wireless communication system includes a radio frequency (RF) module and a processor. The processor is configured to receive uplink scheduling information from a base station (BS), and repeatedly transmit a PUSCH based on the uplink scheduling information. When the PUSCH is repeatedly transmitted in a PRACH transmission gap, at least a part of the repeated transmissions of the PUSCH is dropped or delayed.

The PRACH transmission gap may be a time gap defined between repeated PRACH transmission periods allocated in a cell.

When the PUSCH is repeatedly transmitted in the PRACH transmission gap, one resource unit (RU) or slot at the start of the repeated PUSCH transmissions within the PRACH transmission gap may be dropped.

When the PUSCH is repeatedly transmitted in the PRACH transmission gap and a demodulation reference signal (DMRS) is located in a first symbol of a slot during the repeated PUSCH transmissions, all of the repeated PUSCH transmissions within the PRACH transmission gap may be dropped.

When the PUSCH is repeatedly transmitted in the PRACH transmission gap and a DMRS is located in a first symbol of a slot during the repeated PUSCH transmissions, the repeated PUSCH transmissions may be delayed by one RU or slot within the PRACH transmission gap.

The PRACH may include a narrowband PRACH (NPRACH), and the PUSCH may include a narrowband PUCCH (NPUCCH).

The wireless communication system may include a wireless communication system supporting narrowband Internet of things (NB-IoT).

Advantageous Effects

According to the present disclosure, wireless signal transmission and reception can be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 10 is a diagram illustrating resource allocation for an NB-IoT signal and an LTE signal in an in-band mode.

BEST MODE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present disclosure.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
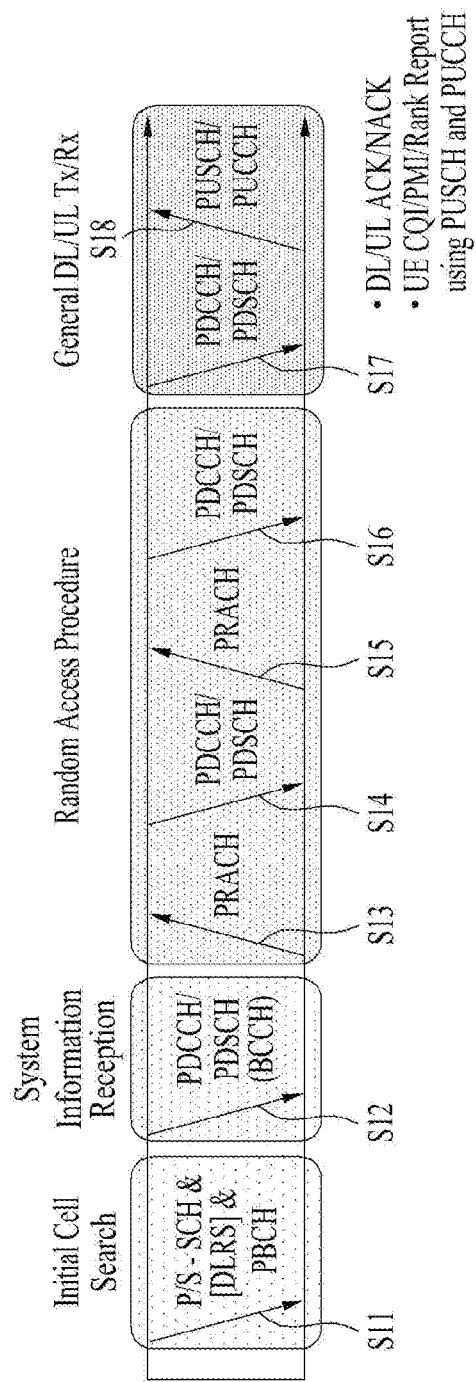
FIG. 1 is a diagram illustrating physical channels used in a $3^{rd}$ generation partnership project (3GPP) long term evolution (-advanced) (LTE(-A)) as an exemplary wireless communication system and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
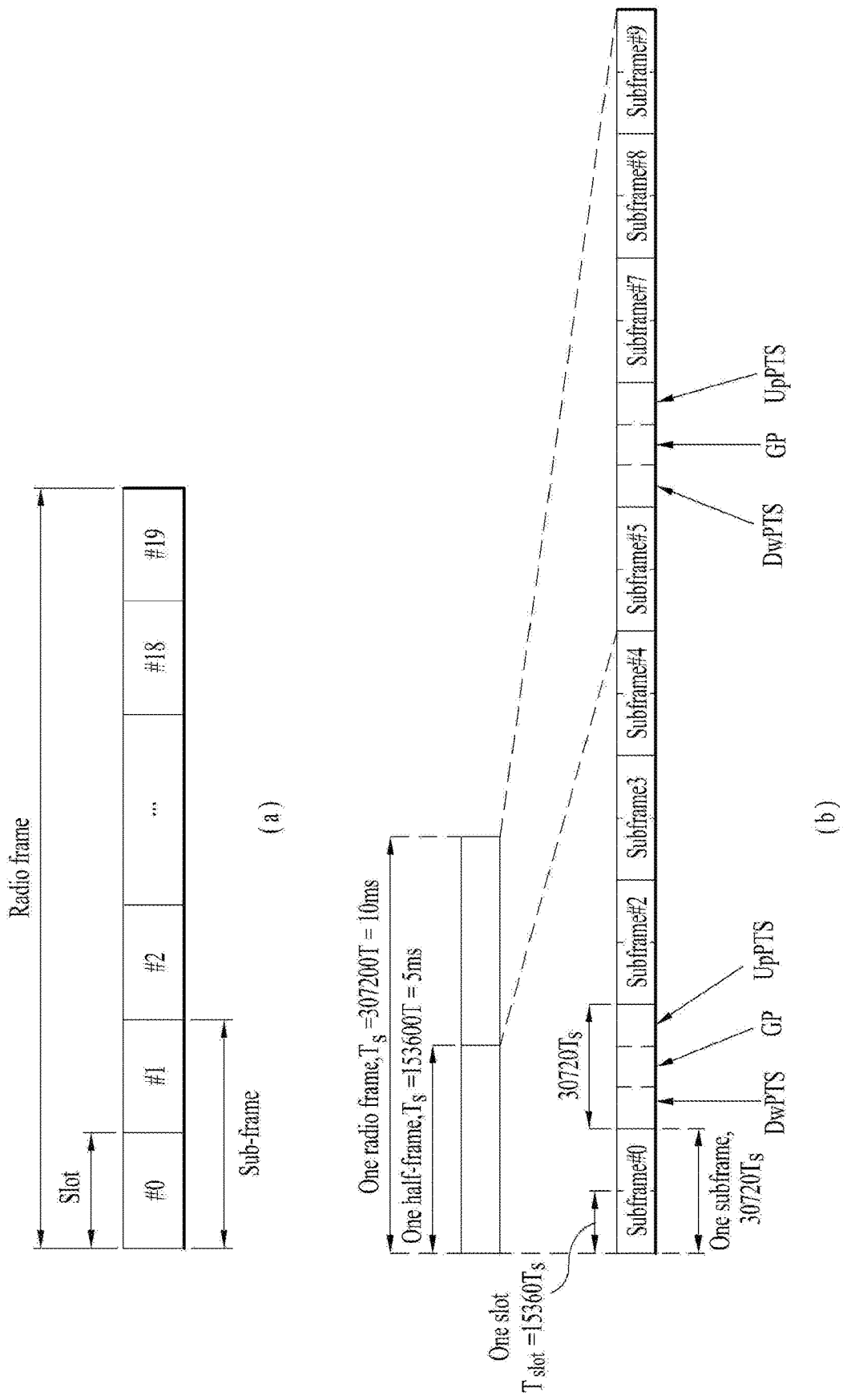
FIG. 2 is a diagram illustrating a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2($a$) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2($b$) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
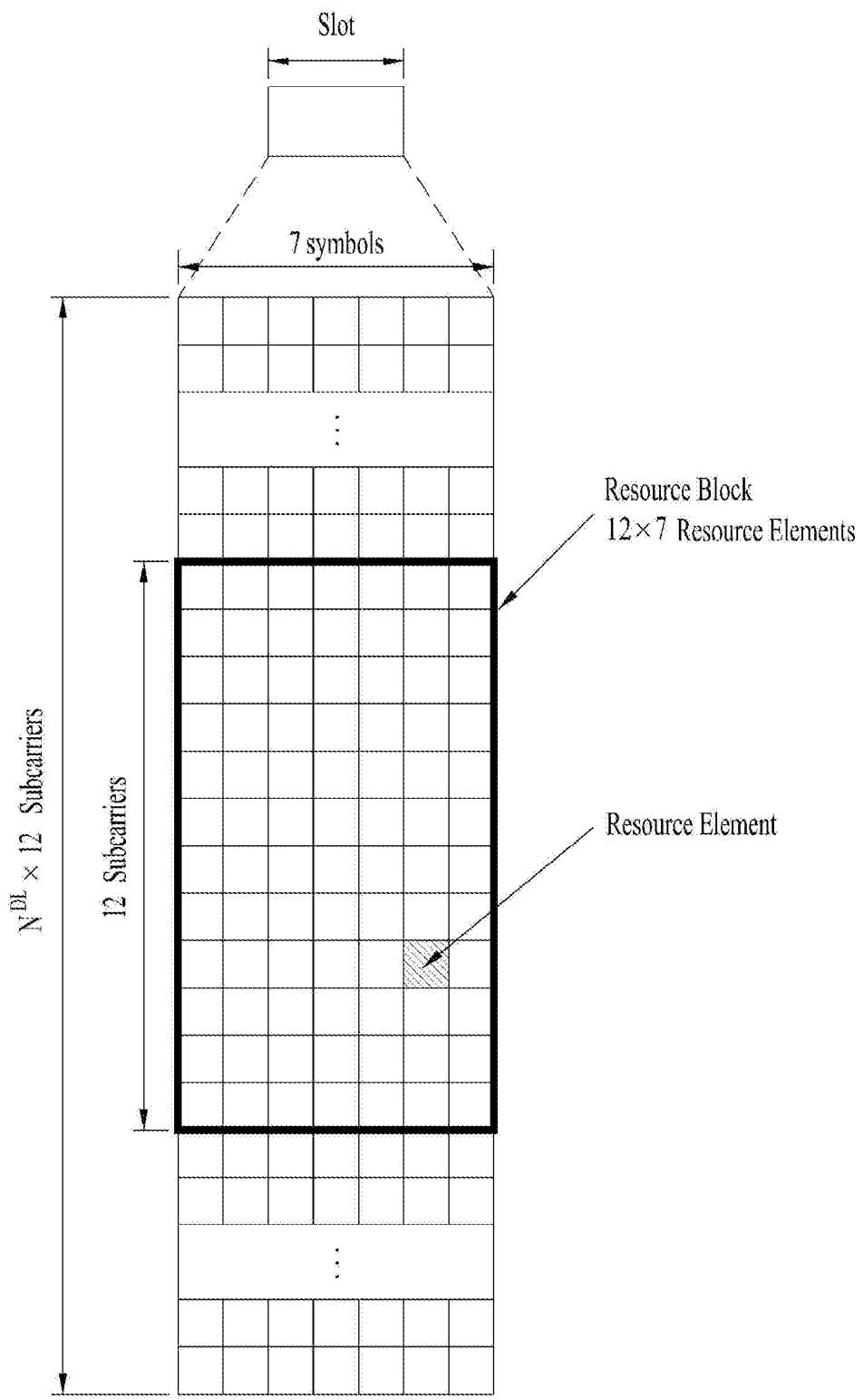
FIG. 3 is a diagram illustrating a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present disclosure is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
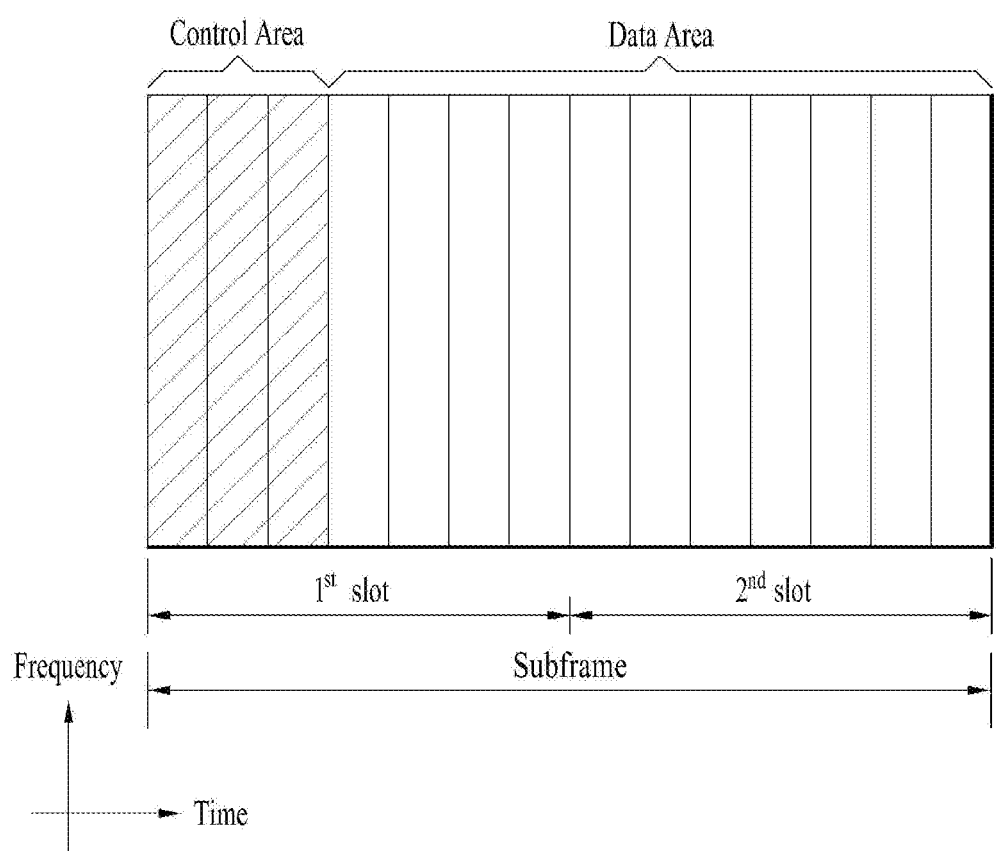
FIG. 4 is a diagram illustrating a downlink (DL) subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode (TM)
  Transmission mode 1: Transmission from a single base station antenna port
  Transmission mode 2: Transmit diversity
  Transmission mode 3: Open-loop spatial multiplexing
  Transmission mode 4: Closed-loop spatial multiplexing
  Transmission mode 5: Multi-user MIMO (Multiple Input Multiple Output)
  Transmission mode 6: Closed-loop rank-1 precoding
  Transmission mode 7: Single-antenna port (port 5) transmission
  Transmission mode 8: Double layer transmission (ports 7 and 8) or single-antenna port (port 7 or 8) transmission
  Transmission mode 9: Transmission through up to 8 layers (ports 7 to 14) or single-antenna port (port 7 or 8) transmission DCI Format
  Format 0: Resource grants for PUSCH transmission
  Format 1: Resource assignments for single codeword PDSCH transmission (transmission modes 1, 2 and 7)
  Format 1A: Compact signaling of resource assignments for single codeword PDSCH (all modes)
  Format 1B: Compact resource assignments for PDSCH using rank-1 closed loop precoding (mod 6)
  Format 1C: Very compact resource assignments for PDSCH (e.g. paging/broadcast system information)
  Format 1D: Compact resource assignments for PDSCH using multi-user MIMO (mode 5)
  Format 2: Resource assignments for PDSCH for closed-loop MIMO operation (mode 4)
  Format 2A: Resource assignments for PDSCH for open-loop MIMO operation (mode 3)
  Format 3/3A: Power control commands for PUCCH and PUSCH with 2-bit/1-bit power adjustments FIG. 5 illustrates a structure of an uplink subframe used in LTE(-A).

Figure 5:
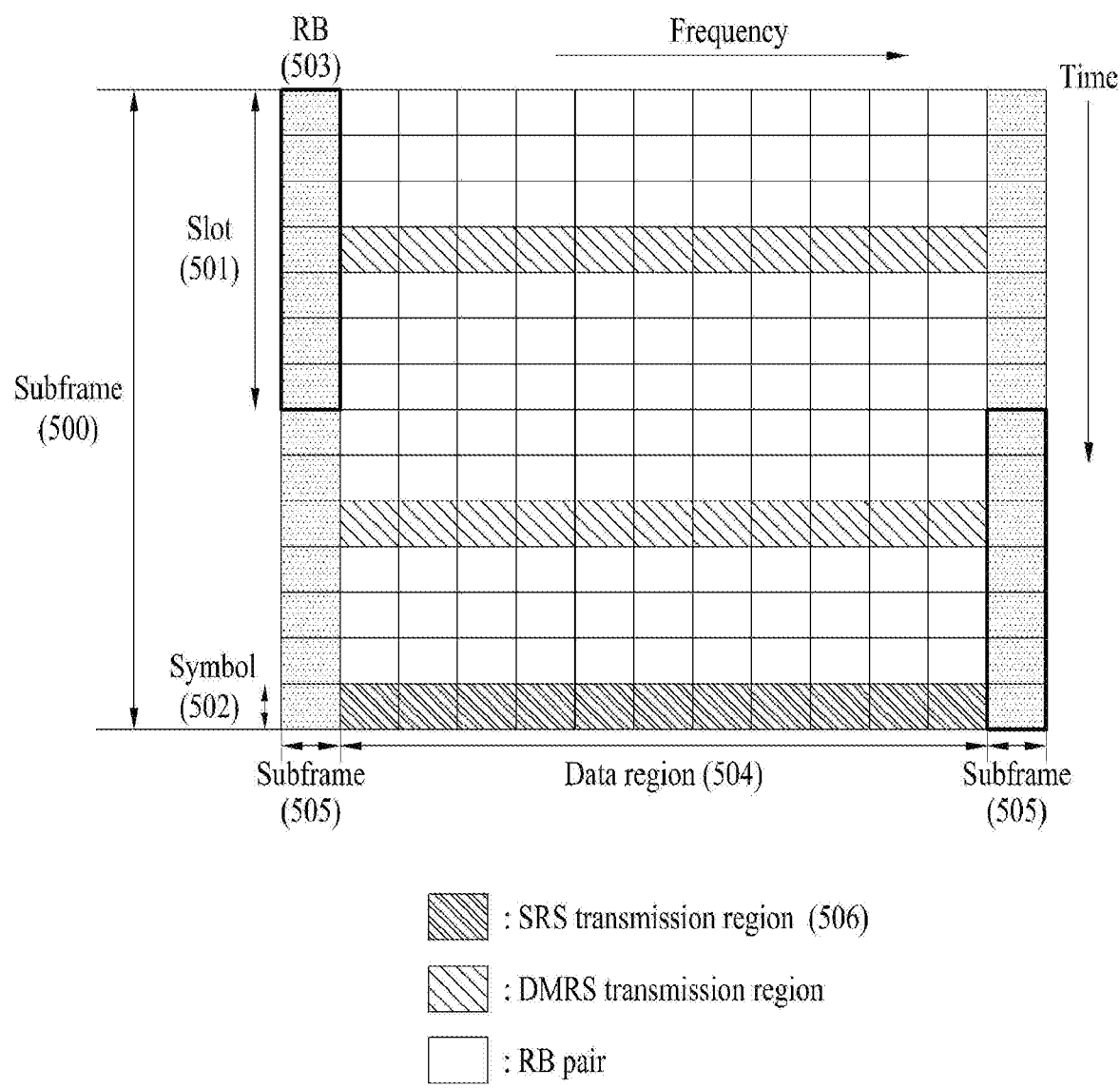
FIG. 5 is a diagram illustrating the structure of an uplink (UL) subframe used in LTE(-A).

Referring to FIG. 5, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Figure 6:
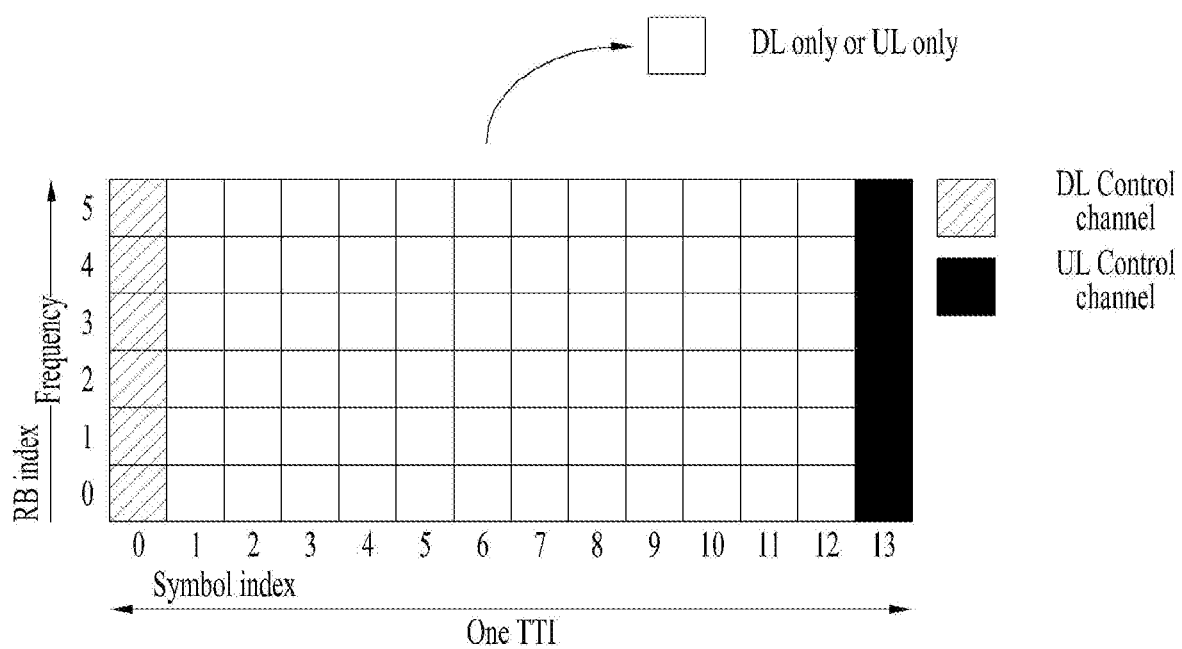
FIG. 6 is a diagram illustrating a self-contained subframe structure.

To minimize data transmission latency, a self-contained subframe is considered in the next-generation radio access technology (RAT). FIG. 6 illustrates an exemplary self-contained subframe structure. In FIG. 6, the hatched area represents a DL control region, and the black area represents a UL control region. The area having no marks may be used for either DL data transmission or UL data transmission. In this structure, DL transmission and UL transmission are sequentially performed in one subframe to transmit DL data and receive a UL ACK/NACK for the DL data in the subframe. As a result, the resulting reduction of a time taken to retransmit data when a data transmission error occurs may lead to minimization of the latency of a final data transmission.

At least the following four subframe types may be considered as exemplary self-contained subframe types. Periods are enumerated in time order.

DL control period+DL data period+guard period (GP)+ UL control period

DL control period+DL data period

DL control period+GP+UL data period+UL control period

DL control period+GP+UL data period

A PDFICH, a PHICH, and a PDCCH may be transmitted in the DL control period, and a PDSCH may be transmitted in the DL data period. A PUCCH may be transmitted in the UL control period, and a PUSCH may be transmitted in the UL data period. The GP provides a time gap for switching from a transmission mode to a reception mode or from the reception mode to the transmission mode at an eNB and a UE. Some OFDM symbol(s) at a DL-to-UL switching time may be configured as the GP.

In the environment of the 3GPP NR system, different OFDM numerologies, for example, different subcarrier spacings (SCSs) and hence different OFDM symbol (OS) durations may be configured between a plurality of cells aggregated for one UE. Accordingly, the (absolute time) duration of a time resource (e.g., SF, slot or TTI) (referred to as a time unit (TU) for convenience) including the same number of symbols may be set differently for the aggregated cells. Herein, the term symbol may cover OFDM symbol and SC-FDMA symbol.

Figure 7:
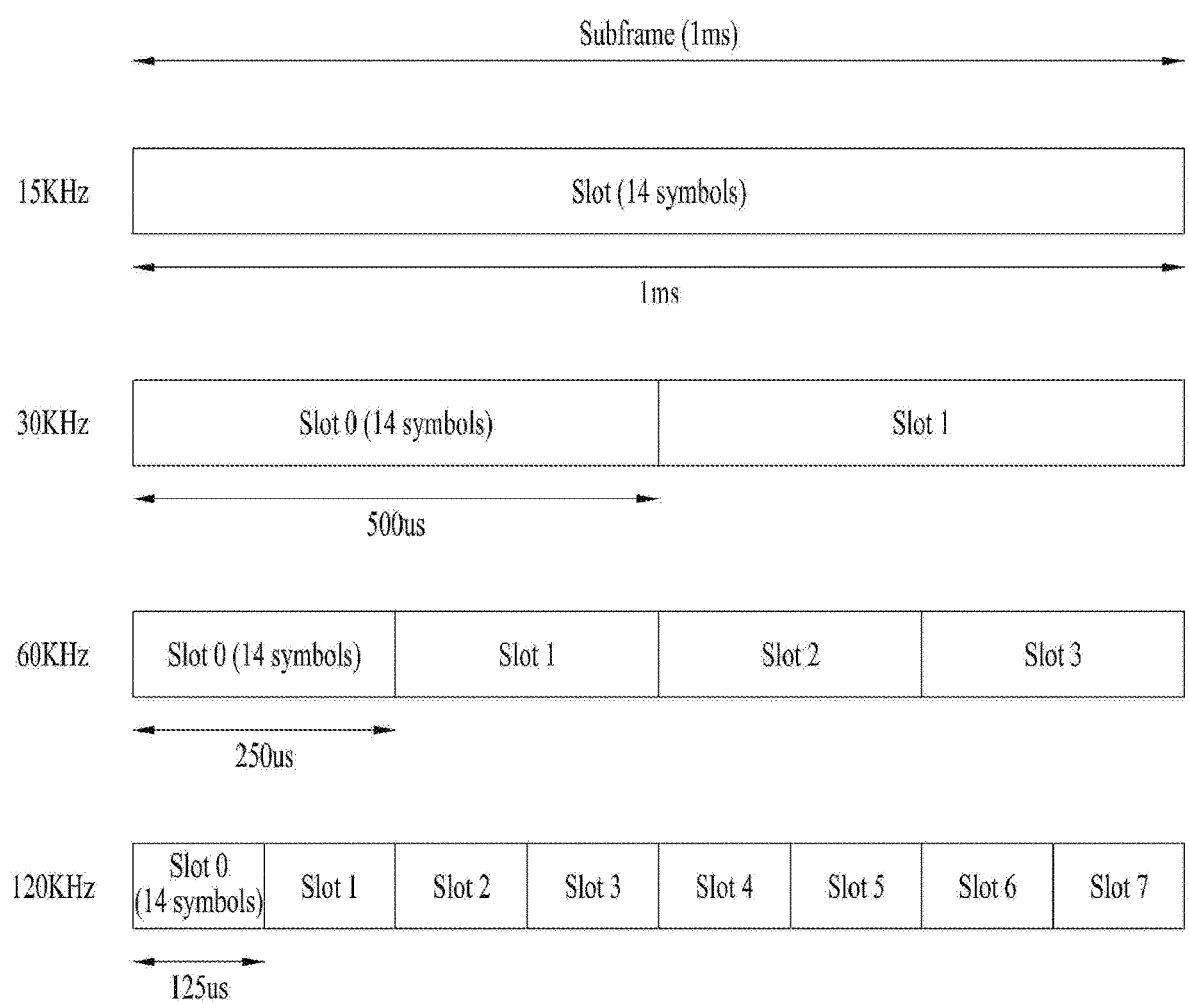
FIG. 7 is a diagram illustrating a frame structure defined for 3GPP new radio access technology (NR).

FIG. 7 illustrates a frame structure for 3GPP NR. In 3GPP NR, one radio frame includes 10 subframes each being 1 ms in duration, like a radio frame in LTE/LTE-A (see FIG. 2). One subframe includes one or more slots and the length of a slot varies with an SCS. 3GPP NR supports SCSs of 15 KHz, 30 KHz, 60 KHz, 120 KHz, and 240 KHz. A slot corresponds to a TTI of FIG. 6.

As noted from Table 4, the number of symbols per slot, the number of slots per frame, and the number of slots per subframe vary according to an SCS.

TABLE 4

| SCS ($15*2^u$) | Number of symbols per slot | Number of slots per frame | Number of slots per subframe |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

A description will be given of narrowband Internet of things (NB-IoT). While NB-IoT is described based on the 3GPP LTE standards for convenience, the following description is also applicable to the 3GPP NR standards. For this purpose, some technical configurations may be replaced with other ones in interpretation (e.g., LTE band→NR band and subframe→slot).

NB-IoT supports three operation modes: in-band mode, guard-band mode, and stand-alone mode. The same requirements apply to each mode.

(1) In-band mode: a part of the resources of the LTE band are allocated to NB-IoT.

(2) Guard-band mode: a guard frequency band of the LTE band is used, and an NB-IoT carrier is arranged as close as possible to an edge subcarrier of the LTE band.

(3) Stand-alone mode: some carriers in the GSM band are allocated to NB-IoT.

An NB-IoT UE searches for an anchor carrier in units of 100 kHz, for initial synchronization, and the center frequency of the anchor carrier should be located within ±7.5 kHz from a 100-kHz channel raster in the in-band and guard-band. Further, the center 6 physical resource blocks (PRBs) of the LTE PRBs are not allocated to NB-IoT. Therefore, the anchor carrier may be located only in a specific PRB.

Figure 8:
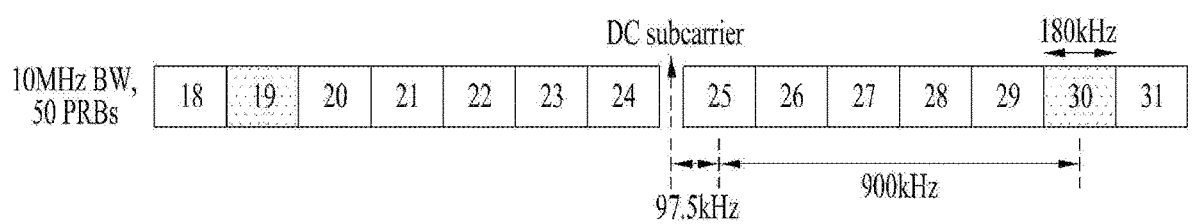
FIG. 8 is a diagram illustrating arrangement of an in-band anchor carrier in an LTE bandwidth of 10 MHz.

FIG. 8 is a diagram illustrating arrangement of an in-band anchor carrier in an LTE bandwidth of 10 MHz.

Referring to FIG. 8, a direct current (DC) subcarrier is located on a channel raster. Since the center frequency spacing between adjacent PRBs is 180 kHz, the center frequencies of PRBs 4, 9, 14, 19, 30, 35, 40 and 45 are located at ±2.5 kHz from the channel raster. When the bandwidth is 20 MHz, the center frequency of a PRB suitable for transmission on the anchor carrier is located at ±2.5 kHz from the channel raster, and when the bandwidth is 3 MHz, 5 MHz, or 15 MHz, the center frequency of a PRB suitable for transmission on the anchor carrier is located at ±7.5 kHz from the channel raster.

In the guard-band mode, given bandwidths of 10 MHz and 20 MHz, the center frequency of a PRB immediately adjacent to an edge PRB of the LTE system is located at ±2.5 kHz from the channel raster. Further, given bandwidths of 3 MHz, 5 MHz, and 15 MHz, a guard frequency band corresponding to three subcarriers from an edge PRB is used, and thus the center frequency of the anchor carrier may be located at ±7.5 kHz from the channel raster.

In the stand-alone mode, an anchor carrier is aligned with the 100-kHz channel raster, and all GSM carriers including the DC carrier may be available as NB-IoT anchor carriers.

Further, NB-IoT may support multiple carriers, and a combination of in-band and in-band, a combination of in-band and guard-band, a combination of guard-band and guard-band, and a combination of stand-alone and stand-alone are available.

NB-IoT DL uses OFDMA with a 15-kHz SCS. OFDMA provides orthogonality between subcarriers, so that the NB-IoT system and the LTE system may coexist smoothly.

For NB-IoT DL, physical channels such as a narrowband physical broadcast channel (NPBCH), a narrowband physical downlink shared channel (NPDSCH), and a narrowband physical downlink control channel (NPDCCH) may be provided, and physical signals such as a narrowband primary synchronization signal (NPSS), a narrowband primary synchronization signal (NSSS), and a narrowband reference signal (NRS) are provided.

The NPBCH delivers minimum system information required for an NB-IoT UE to access the system, a master information block-narrowband (MIB-NB) to the NB-IoT UE. The NPBCH may be transmitted repeatedly eight times in total for coverage enhancement. The transport block size (TBS) of the MIB-NB is 34 bits and updated every TTI of 640 ms. The MIB-NB includes information about an operation mode, a system frame number (SFN), a hyper-SFN, the number of cell-specific reference signal (CRS) ports, and a channel raster offset.

The NPSS is composed of a Zadoff-Chu (ZC) sequence of length 11 and a root index of 5. The NPSS may be generated by the following equation.

$$d_l(n) = S(l) \cdot e^{-j\frac{\pi u n(n+1)}{11}}, n = 0, 1, \ldots, 10 \quad \text{[Equation 1]}$$

S(l) for symbol index l may be defined as illustrated in Table 5.

TABLE 5

| Cyclic prefix length | S(3), ..., S(13) |
|---|---|
| Normal | 1  1  1  1  −1  −1  1  1  1  −1  1 |

The NSSS is composed of a combination of a ZC sequence of length 131 and a binary scrambling sequence such as a Hadamard sequence. The NSSS indicates a PCID to NB-IoT UEs within the cell by the combination of sequences.

The NSSS may be generated by following equation.

$$d(n) = b_q(m)e^{-j2\pi\theta_f n}e^{-j\frac{\pi u n'(n'+1)}{131}} \quad \text{[Equation 2]}$$

Variables applied to Equation 2 may be defined as follows.

$$n = 0, 1, \ldots, 131 \quad \text{[Equation 3]}$$
$$n' = n \bmod 131$$
$$m = n \bmod 128$$
$$u = N_{ID}^{Ncell} \bmod 126 + 3$$
$$q = \left\lfloor \frac{N_{ID}^{Ncell}}{126} \right\rfloor$$

A binary sequence $b_q(m)$ may be defined as illustrated in Table 6, and $b_0(m)$ to $b_3(m)$ represent columns 1, 32, 64, and 128 of a Hadamard matrix of order 128. A cyclic shift $\theta_f$ for a frame number $n_f$ may be defined by Equation 4 below.

TABLE 6

| q | $b_q(0), \ldots b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 1 −1 −1 1 1 −1 1 −1 1 1 −1 1 −1 −1 1 −1 1 1 −1 −1 1 −1 1 1 −1 −1 1 1 −1 1 −1 −1 1 1 −1 −1 1 1 −1 1 −1 1 1 −1 1 −1 −1 1 1 −1 −1 1 −1 1 1 −1 −1 1 1 −1 1 −1 −1 1 −1 1 1 −1] |
| 2 | [1 −1 −1 1 −1 1 1 −1 1 1 −1 1 −1 −1 1 −1 1 1 −1 1 −1 −1 1 1 −1 −1 1 −1 1 1 −1 1 −1 1 1 −1 1 −1 −1 1 −1 1 1 −1 −1 1 1 −1 1 −1 −1 1 −1 1 1 1 −1 1 1 −1 −1 1 −1 1 1 −1 −1 1 −1 1 1 −1 −1 1 1 −1 1 −1 −1 1 1 −1 −1 1 1 −1 1 −1 −1 1 1 −1 −1 1 −1 1 1 −1 1 −1 −1 1 −1 1 1 −1 1 1 −1 −1 1] |
| 3 | [1 −1 −1 1 −1 1 1 −1 1 1 −1 1 −1 −1 1 −1 1 1 −1 1 −1 −1 1 1 −1 −1 1 −1 1 1 −1 1 1 −1 −1 1 −1 1 1 −1 1 1 −1 1 −1 −1 1 −1 1 1 −1 1 1 −1 −1 1 −1 1 1 −1 −1 1 1 −1 1 1 −1 1 −1 −1 1 1 −1 −1 1 −1 1 1 −1 −1 1 1 1 −1 1 −1 −1 1 1 −1 −1 1 −1 1 1 −1 1 1 −1 −1 1 −1 1 1 −1 1 1 −1 −1 1 −1] |

$$\theta_f = \frac{33}{132}(n_f/2) \bmod 4 \qquad \text{[Equation 4]}$$

In Equation 4, of represents a radio frame number and mod represents a modulo function.

The NRS, which is a reference signal for channel estimation required for demodulation of a DL physical channel, is generated in the same manner as in LTE. However, the NRS uses a narrowband-physical cell ID (NB-PCID) (or NCell ID or NB-IoT BS ID) as an initial value for initialization. The NRS is transmitted through one or two antenna ports (p=2000 and 2001).

The NPDCCH has the same transmission antenna configuration as the NPBCH, and delivers DCI. The NPDCCH supports three types of DCI formats. DCI format N0 includes scheduling information about a narrowband physical uplink shared channel (NPUSCH), and DCI formats N1 and N2 includes NPDSCH scheduling information. The NPDCCH may be transmitted repeatedly up to 2048 times, for coverage enhancement.

The NPDSCH is used to transmit data of a transport channel such as a DL-SCH or a paging channel (PCH). The NPDSCH has a maximum TBS of 680 bits and may be transmitted repeatedly up to 2048 times, for coverage enhancement.

Figure 9:
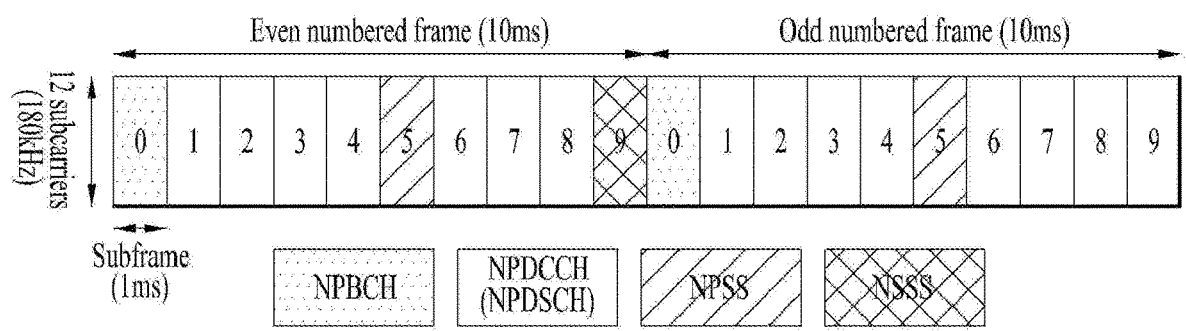
FIG. 9 is a diagram illustrating positions where narrowband Internet of things (NB-IoT) physical DL channels/signals are transmitted in a frequency division duplex (FDD) LTE system.

FIG. 9 is a diagram illustrating positions where narrowband NB-IoT physical DL channels/signals are transmitted in an FDD LTE system.

Referring to FIG. 9, the NPBCH is transmitted in the first subframe of each radio frame, the NPSS is transmitted in the sixth subframe of each radio frame, and the NSSS is transmitted in the last subframe of each even-numbered frame. An NB-IoT UE acquires frequency synchronization, symbol synchronization, and frame synchronization and searches 504 PCIDs (i.e., BS IDs) by synchronization signals (NPSS and NSSS). The LTS synchronization signals are transmitted in 6 PRBs, whereas the NB-IoT synchronization signals are transmitted in one PRB.

In NB-IoT, UL physical channels include a narrowband physical random access channel (NPRACH) and an NPUSCH, and support single-tone transmission and multi-tone transmission. Multi-tone transmission is supported only for an SCS of 15 kHz, and single-tone transmission is supported for SCSs of 3.5 kHz and 15 kHz. On UL, when the SCS is 15 kHz, orthogonality with the LTE system is maintained, thereby providing optimum performance. However, the 3.75-kHz SCS may destroy the orthogonality, resulting in performance degradation due to interference.

FIG. 10 illustrates exemplary preamble transmissions in NB-IoT. An NPRACH preamble includes four symbol groups, each including a CP and five (SC-FDMA) symbols. The NPRACH supports only single-tone transmission with the 3.75-kHz SCS and provides CPs of 66.7 µs and 266.67 µs in length to support different cell radiuses. Each symbol group is subjected to frequency hopping in the following hopping pattern. Subcarriers carrying the first symbol group are determined pseudo-randomly. The second symbol group hops by one subcarrier, the third symbol group hops by six subcarriers, and the fourth symbol group hops by one subcarrier. In the case of repeated transmissions, the frequency hopping procedure is repeatedly applied. To enhance coverage, the NPRACH preamble may be repeatedly transmitted up to 128 times.

Figure 11:
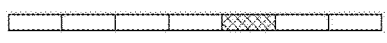
FIG. 11 is a diagram illustrating multi-carrier scheduling.

FIG. 11 illustrates exemplary NPUSCH formats. The NPUSCH supports two formats. NPUSCH format 1 is used for UL-SCH transmission and has a maximum TBS of 1000 bits. NPUSCH format 2 is used for UCI transmission such as HARQ-ACK signaling. NPUSCH format 1 supports single-tone transmission and multi-tone transmission, whereas NPUSCH format 2 supports only single-tone transmission. In single-tone transmission, p/2-binary phase shift keying (BPSK) and p/4-quadrature phase shift keying (QPSK) are used to reduce a peak-to-average power ratio (PAPR). The NPUSCH may occupy a different number of slots in one resource unit (RU) according to a resource allocation. An RU is the smallest resource unit to which a TB is mapped, defined by $N^{UL}_{symb} * N^{UL}_{slots}$ consecutive SC-FDMA symbols in the time domain by $N^{RU}_{sc}$ consecutive subcarriers in the frequency domain. $N^{UL}_{symb}$ represents the number of SC-FDMA symbols in a slot, $N^{UL}_{slots}$ represents the number of slots, and $N^{RU}_{sc}$ represents the number of subcarriers in an RU.

Table 7 lists exemplary RU configurations according to NPUSCH formats and SCSs.

TABLE 7

| NPUSCH format | Subcarrier spacing | $N^{RU}_{sc}$ | $N^{UL}_{slots}$ | $N^{UL}_{symb}$ |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

Scheduling information for transmitting UL-SCH data (e.g., a UL-SCH TB) is included in DCI format N0, which is transmitted on an NPDCCH. DCI format N0 includes information about the starting time, repetition number, number of RUs for transmission of a TB, number of subcarriers, frequency-domain resource positions, MCS, and so on of an NPUSCH.

As illustrated in FIG. 11, a demodulation reference signal (DMRS) is transmitted in one or three SC-FDMA symbols per slot according to an NPUSCH format. The DMRS is multiplexed with data (e.g., a TB and UCI) and transmitted only in an RU carrying data.

Embodiments: Resolution of Collision Between Signal Transmissions

The present disclosure proposes a method of handling collision between an NPUSCH and an NPRACH transmission gap in an NB-IoT system. The present disclosure is applicable to a case in which collision occurs between repeatedly transmitted UL signals or collidable (physical) channels or signals have different transmission timings, not limited to the NB-IoT system.

As described before with reference to FIG. 10, the NPRACH may be transmitted multiple times repeatedly. When the NPRACH needs repeated transmissions for a predetermined time or longer (e.g., 64 repeated transmissions), a transmission gap of a predetermined duration (e.g., 40 ms) may be configured during the repeated NPRACH transmissions. It is regulated that a UE discontinues an NPUSCH transmission in an NPRACH resource period during repeated NPUSCH transmissions. Information about an NPRACH resource configuration (e.g., the repetition number, starting transmission time, and so on of the NPRACH) is broadcast in system information such that all UEs may generally interpret the information. Accordingly, the NB-IoT system may be designed to avoid resource collision between the NPUSCH and the NPRACH. For example, when NPRACH resources are configured to span a predetermined time or longer (e.g., 64 or more repeated transmissions), a UE may interpret an NPRACH transmission gap and may not determine the NPRACH transmission gap to be a part of NPRACH resources, during an NPUSCH transmission. Therefore, the UE may be allowed to transmit an NPUSCH in the NPRACH transmission gap. The NPRACH transmission gap may refer to a time gap defined between repeated NPRACH transmissions/resource periods allocated in a cell.

Figure 12:
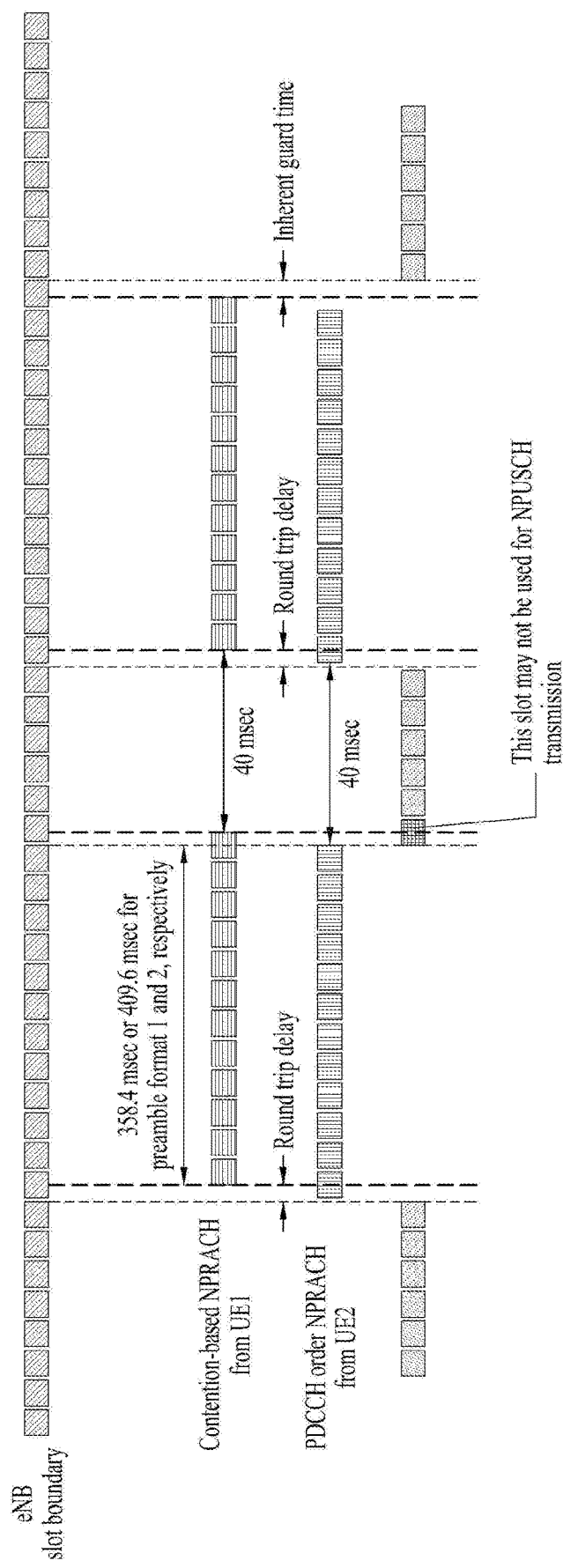
FIG. 12 is a diagram illustrating collision between UL signal transmissions.

Compared to the NPUSCH, the NPRACH may be transmitted in a contention-based manner (contention-based transmission mode). Because a timing advance (TA) is not applied to the NPRACH (TA=0) in the contention-based transmission mode, the eNB may receive the NPRACH after a delay. A maximum NPRACH latency may be a round-trip time (RTT) between the UE and the eNB. In contrast, a TA determined according to UL synchronization is applied to an NPUSCH transmission, and thus the eNB receives the NPUSCH without a delay. Accordingly, when an NPUSCH transmission is allocated at the starting time of the NPRACH transmission gap, a starting partial period of the NPUSCH may collide with an ending partial period of a previous NPRACH transmission at least in the first slot (or subframe) of the NPRACH transmission gap, as illustrated in FIG. 12. The collision may degrade the NPRACH and NPUSCH reception performance of the eNB. However, when the NPRACH is transmitted in a contention-free manner (contention-free transmission mode) or in response to a network order ((N)PDCCH-ordered NPRACH transmission mode), a TA determined according to UL synchronization is applied to the NPRACH so that the eNB may receive the NPRACH without a delay, like the NPUSCH. Therefore, even though the NPUSCH transmission is allocated at the starting time of the NPRACH transmission gap, a starting part of the NPUSCH may not collide with an ending part of the previous NPRACH transmission at least in the first slot (or subframe) of the NPRACH transmission gap.

To avert the above problem, the present disclosure proposes a method of avoiding or mitigating collision between an NPRACH and an NPUSCH, while allowing an NPUSCH transmission in an NPRACH transmission period. The following description is based on the assumption that an NPUSCH is repeatedly transmitted in an NPRACH transmission gap. More specifically, it is assumed that an NPUSCH transmission is requested/allocated at the starting time of an NPRACH transmission gap, for example, in the first slot of the NPRACH transmission gap. When the NPUSCH is not transmitted in the NPRACH transmission gap, the NPRACH and the NPUSCH may be transmitted independently without collision.

[Method #1] It is restricted that the NPUSCH should not be transmitted in a starting part of the NPRACH transmission gap.

An NPUSCH transmission may not be allowed in the NPRACH transmission gap irrespective of an NPRACH transmission mode (e.g., the contention-based, contention free, and (N)PDCCH-ordered NPRACH transmission modes).

An NPUSCH transmission may be allowed in the whole period of the NPRACH transmission gap in an NPRACH transmission mode in which an eNB may receive an NPRACH without a delay (e.g., the contention free or (N)PDCCH-ordered NPRACH transmission mode).

NPRACH resources used in an NPRACH transmission mode in which an eNB may receive an NPRACH without a delay (e.g., the contention free or (N)PDCCH-ordered NPRACH transmission mode) and NPRACH resources used in an NPRACH transmission mode an eNB may receive an NPRACH after a delay (e.g., the contention-based transmission mode) may be distinguished from each other in FDM in the frequency domain. In this case, it may be determined differently whether to allow an NPUSCH transmission in the whole period of the NPRACH transmission gap according to an NPRACH transmission mode of NPRACH resources overlapped with scheduled NPUSCH frequency resources. For example, when the NPRACH is transmitted in the contention-based transmission mode, the NPUSCH transmission may be allowed in a period except for the starting part of the NPRACH transmission gap. In contrast, when the NPRACH is transmitted in the contention-free transmission mode or according to a network order, the NPUSCH transmission may be allowed in the whole period of the NPRACH transmission gap.

[Method #2] It is restricted that an NPUSCH should not be transmitted in an ending part of an NPRACH transmission gap.

An NPUSCH transmission may not be allowed in the NPRACH transmission gap irrespective of an NPRACH transmission mode (e.g., the contention-based, contention free, and (N)PDCCH-ordered NPRACH transmission modes).

An NPUSCH transmission may be allowed in the whole period of the NPRACH transmission gap in an NPRACH transmission mode in which an eNB may receive an NPRACH without a delay (e.g., the contention free or (N)PDCCH-ordered NPRACH transmission mode).

NPRACH resources used in an NPRACH transmission mode in which an eNB may receive an NPRACH without a delay (e.g., the contention free or (N)PDCCH-ordered NPRACH transmission mode) and NPRACH resources used in an NPRACH transmission mode an eNB may receive an NPRACH after a delay (e.g., the contention-based transmission mode) may be distinguished from each other in FDM in the frequency domain. In this case, it may be determined differently whether to allow an NPUSCH transmission in the whole period of the NPRACH transmission gap according to an NPRACH transmission mode of NPRACH resources overlapped with scheduled NPUSCH frequency resources. For example, when the NPRACH is transmitted in the contention-based transmission mode, the NPUSCH transmission may be allowed in a period except for the ending part of the NPRACH transmission gap. In contrast, when the NPRACH is transmitted in the contention-free transmission mode or according to a network order, the NPUSCH transmission may be allowed in the whole period of the NPRACH transmission gap.

[Method #3] A part or all of the ending period of an NPRACH transmission before an NPRACH transmission gap is punctured or dropped.

To transmit an NPUSCH without collision in the whole period of the NPRACH transmission gap, a part of the last period of an NPRACH transmission before the NPRACH transmission gap is punctured, dropped, or rate-matched.

[Method #4] A part or all of the starting period of an NPUSCH transmitted in an NPRACH transmission gap is punctured or dropped.

To transmit an NPUSCH without collision in the whole period of the NPRACH transmission gap, a starting part of the NPUSCH transmitted in the NPRACH transmission gap is punctured, dropped, or rate-matched.

When an NPUSCH transmission is allowed in the NPRACH transmission gap, a starting part of the NPUSCH transmitted in the NPRACH transmission gap may not be transmitted in Method #1 and Method #4. In this case, when a DMRS is omitted, NPUSCH detection performance may be degraded seriously. Therefore, when the DMRS is mapped starting from the first symbol of a slot in an RU, the NPUSCH transmission may not be allowed in the NPRACH transmission gap, or an ending part of an NPRACH transmission before the NPRACH transmission gap may be skipped as in Method #3. In the latter case, however, the UE that transmits the NPRACH does not have knowledge of an NPUSCH format, SCS, and resource allocation of a user which performs a transmission in the NPRACH transmission gap, and thus may not determine whether to skip a part of the NPRACH transmission according to the position of the DMRS in the NPUSCH. Therefore, when the DMRS is mapped starting from the first symbol of the slot in the RU, the UE may drop one whole RU or slot in the first NPUSCH transmission in the NPRACH transmission gap, or postpone the NPUSCH transmission in the NPRACH transmission gap by one RU or slot. To eliminate confusion regarding an NPUSCH transmission order between the eNB and the UE, whether the transmission is postponed or not may be preset or indicated directly by the eNB. In the foregoing proposed method, a delayed transmission is allowed according to the position of the DMRS because severe interference is caused by collision between parts of an NPRACH transmitted without a TA (TA=0) and an NPUSCH transmitted with a TA, when the DMRS is located in the first symbol of a slot.

Further, the NPUSCH may be dropped or delayed by some period (e.g., in RUs/slots) in the NPRACH transmission gap according to the length of the repeatedly transmitted NPUSCH and the length of the NPRACH transmission gap, irrespective of the position of the DMRS in the NPUSCH slot. For example, the delayed NPUSCH transmission may be allowed only when the NPUSCH may be transmitted fully in the NPRACH transmission gap. In contrast, when the NPUSCH transmission may not be completed within the NPRACH transmission gap due to a delay of one RU or slot, it may be configured/defined that a starting part (e.g., one RU/slot) of the NPUSCH transmission in the NPRACH transmission gap is dropped. In this case, the eNB has full knowledge of NPUSCH scheduling information and thus there is no misunderstanding between the eNB and the UE, regarding whether the NPUSCH transmission is dropped or delayed.

Figure 13:
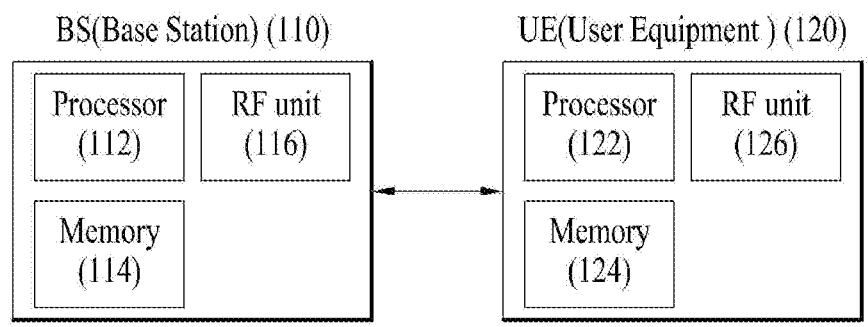
FIG. 13 is a block diagram illustrating a base station (BS) and a user equipment (UE) applicable to the present disclosure.

FIG. 13 illustrates a BS and a UE of a wireless communication system, which are applicable to embodiments of the present disclosure.

Referring to FIG. 13, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present disclosure. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present disclosure. The memory 124 is connected to the processor 122 and stores information related to operations of the processor 122. The RF unit 126 is connected to the processor 122 and transmits and/or receives an RF signal.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system.

The invention claimed is:

1. A method of transmitting a signal by a user equipment (UE) in a wireless communication system, the method comprising:
   receiving uplink scheduling information from a base station (BS); and
   repeatedly transmitting a physical uplink shared channel (PUSCH) based on the uplink scheduling information,
   wherein based on the PUSCH being repeatedly transmitted in a physical random access channel (PRACH) transmission gap, at least one resource unit (RU) or slot at the start of the repeated PUSCH transmissions within the PRACH transmission gap is dropped.

2. The method according to claim 1, wherein the PRACH transmission gap is a time gap defined between repeated PRACH transmission periods allocated in a cell.

3. The method according to claim 1, wherein based on the PUSCH being repeatedly transmitted in the PRACH transmission gap and a demodulation reference signal (DMRS) being located in a first symbol of a slot during the repeated PUSCH transmissions, all of the repeated PUSCH transmissions within the PRACH transmission gap are dropped.

4. The method according to claim 1, wherein the PRACH includes a narrowband PRACH (NPRACH), and the PUSCH includes a narrowband PUCCH (NPUCCH).

5. The method according to claim 1, wherein the wireless communication system includes a wireless communication system supporting narrowband Internet of things (NB-IoT).

6. A user equipment (UE) in a wireless communication system, the UE comprising:
   a radio frequency (RF) module; and
   a processor,
   wherein the processor is configured to receive uplink scheduling information from a base station (BS), and repeatedly transmit a physical uplink shared channel (PUSCH) based on the uplink scheduling information, and
   wherein based on the PUSCH being repeatedly transmitted in a physical random access channel (PRACH) transmission gap, at least one resource unit (RU) or slot at the start of the repeated PUSCH transmissions within the PRACH transmission gap is dropped.

7. The UE according to claim 6, wherein the PRACH transmission gap is a time gap defined between repeated PRACH transmission periods allocated in a cell.

8. The UE according to claim 6, wherein based on the PUSCH being repeatedly transmitted in the PRACH transmission gap and a demodulation reference signal (DMRS) being located in a first symbol of a slot during the repeated PUSCH transmissions, all of the repeated PUSCH transmissions within the PRACH transmission gap are dropped.

9. The UE according to claim 6, wherein the PRACH includes a narrowband PRACH (NPRACH), and the PUSCH includes a narrowband PUCCH (NPUCCH).

10. The UE according to claim 6, wherein the wireless communication system includes a wireless communication system supporting narrowband Internet of things (NB-IoT).

* * * * *